(12) United States Patent
Furuta

(10) Patent No.: US 10,353,136 B2
(45) Date of Patent: Jul. 16, 2019

(54) PLANAR ILLUMINATION APPARATUS AND SUBSTRATE

(71) Applicant: MINEBEA MITSUMI Inc., Nagano (JP)

(72) Inventor: Makoto Furuta, Shizuoka (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/676,120

(22) Filed: Aug. 14, 2017

(65) Prior Publication Data
US 2018/0059313 A1    Mar. 1, 2018

(30) Foreign Application Priority Data

Aug. 26, 2016    (JP) ................................. 2016-166289
Apr. 27, 2017    (JP) ................................. 2017-088637

(51) Int. Cl.
*F21V 8/00*    (2006.01)

(52) U.S. Cl.
CPC ........... *G02B 6/0068* (2013.01); *G02B 6/009* (2013.01); *G02B 6/0083* (2013.01); *G02B 6/0088* (2013.01); *G02B 6/0091* (2013.01); *G02B 6/0051* (2013.01); *G02B 6/0053* (2013.01); *G02B 6/0055* (2013.01)

(58) Field of Classification Search
None
See application file for complete search history.

(56) References Cited

U.S. PATENT DOCUMENTS

| 9,970,597 | B2 | 5/2018 | Nambu | |
| 2007/0008457 | A1* | 1/2007 | Takahashi | G02B 6/0018 349/64 |
| 2008/0037285 | A1* | 2/2008 | Eda | G02B 6/0083 362/631 |
| 2009/0185099 | A1 | 7/2009 | Watanabe et al. | |
| 2009/0207630 | A1* | 8/2009 | Satoh | G02B 6/0085 362/615 |
| 2010/0053493 | A1* | 3/2010 | Kuwajima | G02B 6/0068 349/58 |
| 2012/0153313 | A1* | 6/2012 | Yokotani | H01L 33/486 257/88 |

(Continued)

FOREIGN PATENT DOCUMENTS

| JP | 2008-298905 A | 12/2008 |
| JP | 2009-069713 A | 4/2009 |

(Continued)

OTHER PUBLICATIONS

Japanese Office Action dated Jul. 24, 2018 for corresponding Japanese Application No. 2017-088637 and English translation.

*Primary Examiner* — Elmito Breval
(74) *Attorney, Agent, or Firm* — Pearne & Gordon LLP

(57) ABSTRACT

A planar illumination apparatus according to an embodiment includes a light guide plate that outputs light entered into the light guide plate through a side face of the light guide plate, a plurality of light sources that are arranged on the side face side, and emit light to be entered into the side face, a substrate having a mounting surface where the light sources are mounted, and first wiring that is formed on an opposite surface opposite to the mounting surface of the substrate, and connects serially the light sources with each other.

19 Claims, 8 Drawing Sheets

(56) References Cited

U.S. PATENT DOCUMENTS

| | | | | |
|---|---|---|---|---|
| 2013/0107526 A1* | 5/2013 | Ishibashi | ................ | F21S 4/007 |
| | | | | 362/237 |
| 2013/0229596 A1* | 9/2013 | Hosoki | ................... | F21V 21/00 |
| | | | | 349/65 |
| 2014/0036205 A1* | 2/2014 | Sugiura | ............... | H01L 25/0753 |
| | | | | 349/69 |
| 2015/0179905 A1* | 6/2015 | Ohmae | ............ | G02F 1/133603 |
| | | | | 257/88 |
| 2016/0128143 A1* | 5/2016 | Kazikawa | ............ | G02B 6/0083 |
| | | | | 362/97.2 |
| 2016/0150640 A1* | 5/2016 | Sugawara | ............ | H05K 1/0274 |
| | | | | 362/612 |
| 2016/0195671 A1* | 7/2016 | Kusunoki | ............ | G02B 6/0083 |
| | | | | 362/613 |

FOREIGN PATENT DOCUMENTS

| | | |
|---|---|---|
| JP | 2010-020264 A | 1/2010 |
| JP | 2010-287871 A | 12/2010 |
| JP | 2015-165525 A | 9/2015 |

* cited by examiner

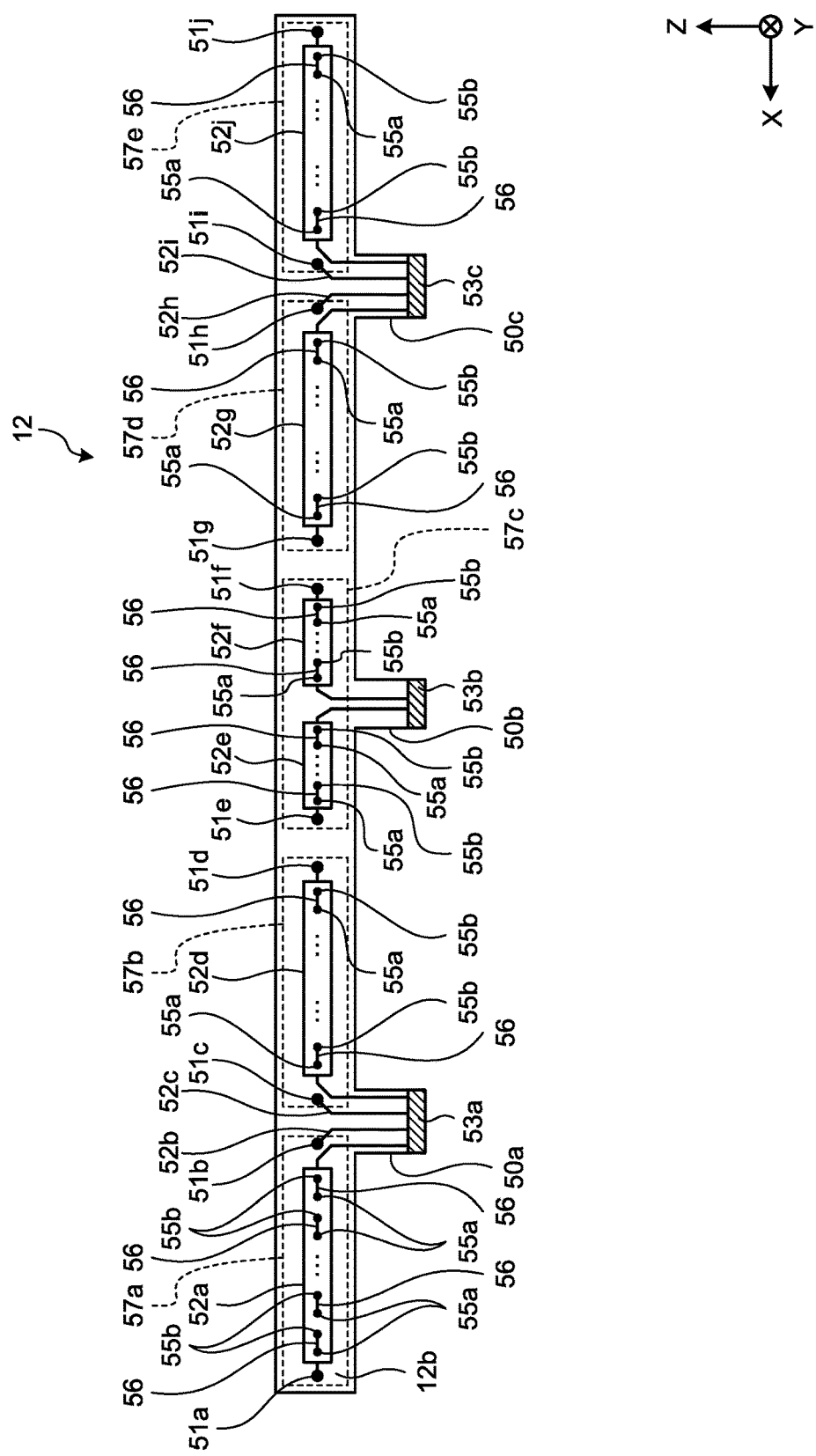

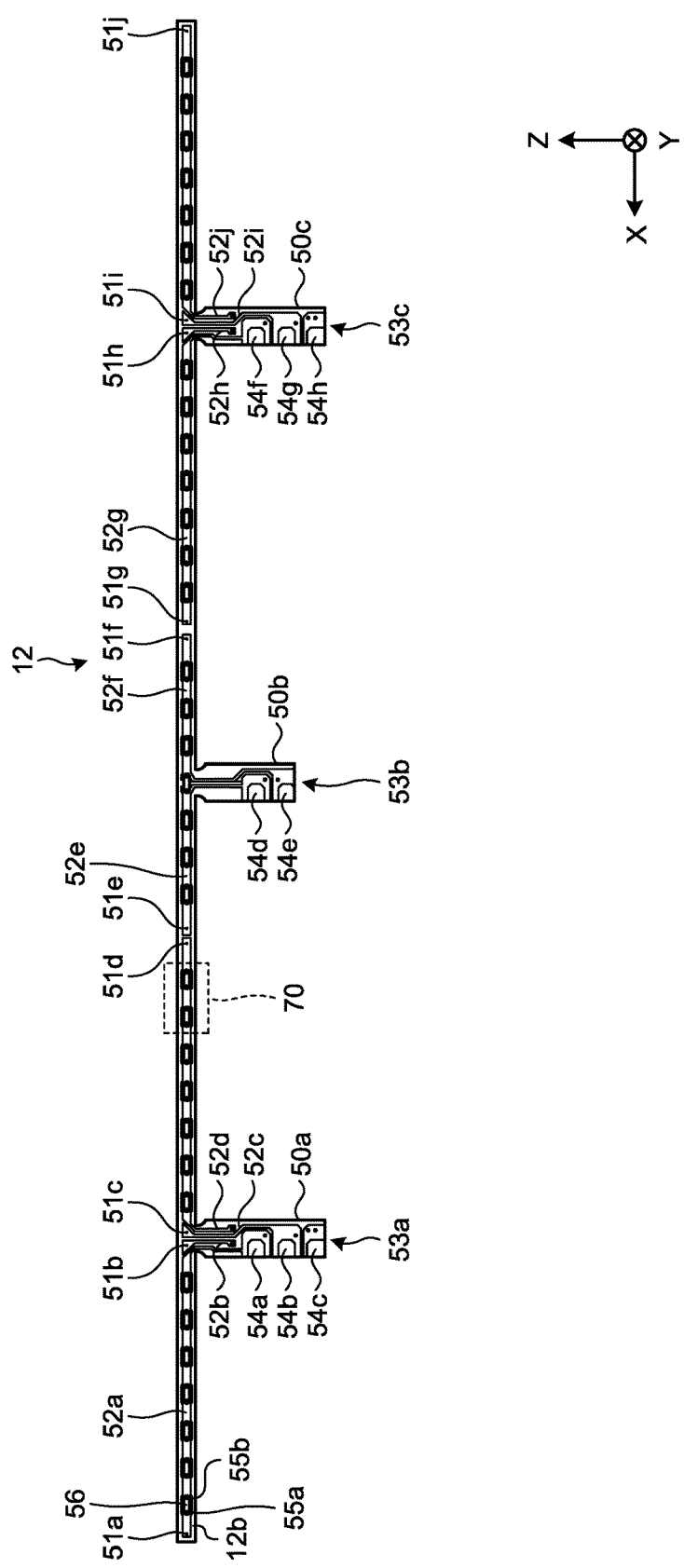

PLANAR ILLUMINATION APPARATUS AND SUBSTRATE

CROSS-REFERENCE TO RELATED APPLICATION(S)

The present application claims priority to and incorporates by reference the entire contents of Japanese Patent Application No. 2016-166289 filed in Japan on Aug. 26, 2016 and Japanese Patent Application No. 2017-088637 filed in Japan on Apr. 27, 2017.

BACKGROUND OF THE INVENTION

1. Field of the Invention

The present invention relates to a planar illumination apparatus and a substrate.

2. Description of the Related Art

There exists a planar illumination apparatus such that a plurality of light emitting diodes (LED) are arranged to face the light entering surface of a light guide plate in an opposed manner. In the planar illumination apparatus, for example, the LEDs are arranged in line on a mounting surface in the longitudinal direction of flexible printed circuits (FPC), and wiring each of which connects serially the LEDs adjacent to each other (hereinafter, referred to as "series wiring") is formed on the mounting surface (see Japanese Patent Application Laid-open No. 2008-298905, for example).

However, to consider a case in which the series wiring is formed on the mounting surface of the FPC, when a distance between the LEDs adjacent to each other becomes small, it becomes difficult to arrange a cover lay (insulating layer) so as to cover the series wiring. Furthermore, a land part where the cover lay is not formed thus exposing a wiring layer, the land part being electrically connected with the LED, and the electrode of the LED are electrically connected with each other by soldering. When solder used for soldering flows onto the series wiring narrow in wiring width from the land part, stress concentration is liable to easily occur at the end of the solder. This phenomenon is explained with reference to FIGS. 9 to 11.

FIGS. 9 to 11 are views for explaining problems when the series wiring is formed on the mounting surface of the FPC. In FIG. 9, an electrode 101a of an LED 101 and wiring 104a of a land part 104 arranged on a mounting surface 103a of an FPC 103 are electrically connected with each other by a solder 105. Furthermore, an electrode 102a of an LED 102 adjacent to the LED 101 and wiring 106a of a land part 106 arranged on the mounting surface 103a are electrically connected with each other by a solder 107. FIG. 9 illustrates a case in which the solder 105 and the solder 107 flow onto series wiring 108 that serially connects the LEDs 101 and 102 adjacent to each other. Here, when stress is applied in the direction indicated by each of arrows 110 and 111 in FIG. 10 by handling such as reworking, the stress concentration is liable to occur at an end 105a of the solder 105 or an end 107a of the solder 107 that are illustrated in FIG. 11, and a disconnection 108a or 108b is liable to occur in the series wiring 108.

As mentioned above, when the series wiring is formed on the mounting surface of the FPC, it is difficult to arrange the cover lay, and the stress concentration is liable to occur thus giving rise to a high possibility that disconnections occur in the series wiring. It is considered that this tendency becomes remarkable along with the decrease of the distance between the LEDs adjacent to each other, and along with the decrease of wiring width (dimension of wiring in the transverse direction (a direction intersecting with the direction in which the LEDs are arranged in line) of the FPC) due to the miniaturization of the planar illumination apparatus.

SUMMARY OF THE INVENTION

A planar illumination apparatus according to one embodiment of the present invention includes a light guide plate that outputs light entered into the light guide plate through a side face of the light guide plate, a plurality of light sources that are arranged on the side face side, and emit light to be entered into the side face, a substrate having a mounting surface where the light sources are mounted, and first wiring that is formed on an opposite surface opposite to the mounting surface of the substrate, and connects serially the light sources with each other.

BRIEF DESCRIPTION OF THE DRAWINGS

FIG. 3A is a front view illustrating schematically the opposite surface of an FPC according to the embodiment;

FIG. 4 is a front view illustrating an illustrative example of the opposite surface of the FPC according to the embodiment;

DETAILED DESCRIPTION OF THE PREFERRED EMBODIMENTS

Figure 1:
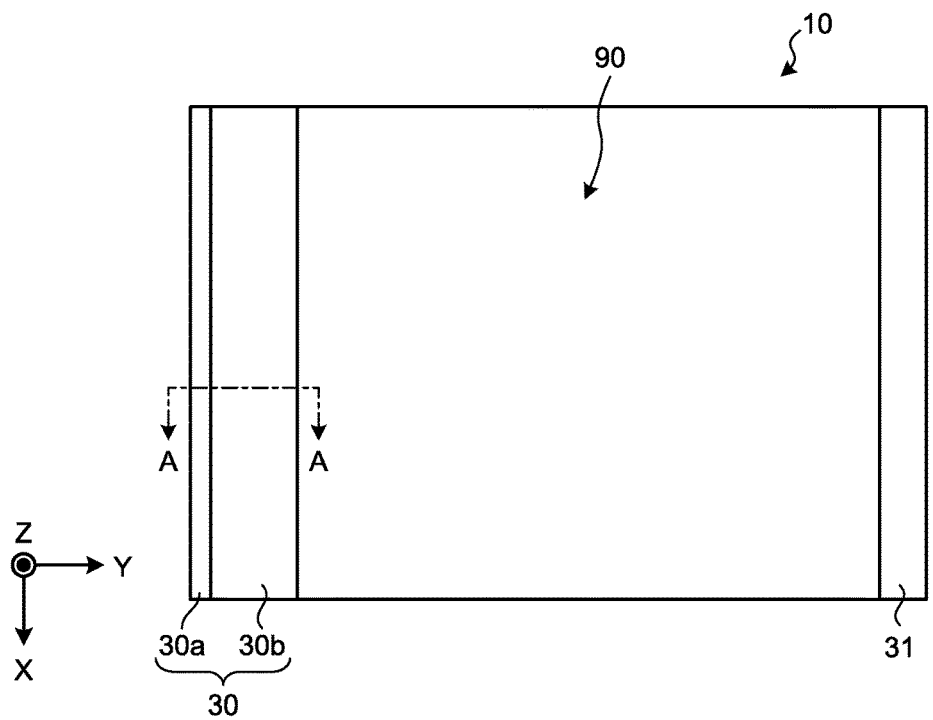
FIG. 1 is a front view illustrating one example of the external appearance of a planar illumination apparatus according to an embodiment.

Hereinafter, a planar illumination apparatus and a substrate according to an embodiment are explained with reference to drawings. Here, in the drawings, a dimensional relation between respective elements, or the dimensional ratio of the respective elements may be different from actual dimensions. In the relation between the drawings also, there may be a case that the dimensional relations or the dimensional ratios illustrated in the respective drawings are different from each other.

Embodiment

FIG. 1 is a front view illustrating one example of the external appearance of a planar illumination apparatus according to an embodiment. In the example illustrated in FIG. 1, the shape of a planar illumination apparatus 10 according to the embodiment is an approximately rectangular shape as viewed in a top view. One end side of the planar illumination apparatus 10 in the longitudinal direction (Y-axis direction) is covered with a shielding sheet 30 including a first shielding sheet 30a and a second shielding sheet 30b. The other end side of the planar illumination apparatus 10 in the longitudinal direction is covered with a shielding sheet 31. Furthermore, the planar illumination apparatus 10 emits light from a light-emitting region (also referred to as "light-emitting area") 90 that is not covered with the shielding sheets 30 and 31. That is, the shielding sheets 30 and 31 specify the light-emitting region 90. The planar illumination apparatus 10 according to the present embodiment is used as a back light of a liquid crystal display. The liquid crystal display is, for example, used for a smart phone.

Here, in FIG. 1, the shielding sheet 30 is larger in width than the shielding sheet 31. This is because the shielding sheet 31 covers a light guide plate 16, a diffusion sheet 18, and a prism sheet 19 that exist in the lower part of the shielding sheet 31 while the shielding sheet 30 covers a comparatively large area including an LED 14, an FPC 12, and the like in addition to the light guide plate 16, the diffusion sheet 18, and the prism sheet 19 that exist in the lower part of the shielding sheet 30. The light guide plate 16, the diffusion sheet 18, the prism sheet 19, the LED 14, and the FPC 12 are described below.

Figure 2:
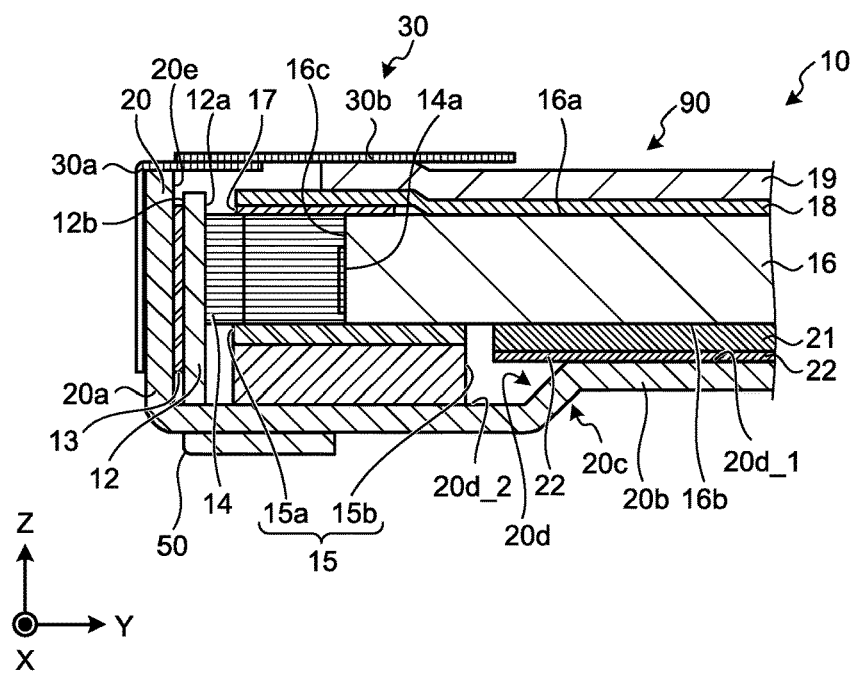
FIG. 2 is a cross-sectional view taken along a line A-A in FIG. 1.

FIG. 2 is a cross-sectional view taken along a line A-A in FIG. 1. As illustrated in FIG. 2, the planar illumination apparatus 10 has the FPC 12 as a substrate (mounting board), a fixing member 13, the LED 14 as a light source (punctiform light source), a first connecting member 15, the light guide plate 16, a second connecting member 17, the diffusion sheet 18, the prism sheet 19, a frame 20, a reflective sheet 21, and the shielding sheet 30.

The frame 20 houses the FPC 12, the fixing member 13, the LED 14, the first connecting member 15, the light guide plate 16, the second connecting member 17, the diffusion sheet 18, the prism sheet 19, the reflective sheet 21, and a double-sided tape 22. The frame 20 has a side wall 20a and a bottom 20b. The frame 20 is, for example, a sheet-metal frame made of stainless steel that has large rigidity and a large light reflectance.

The bottom 20b has a shape extending along a principal surface 16b of the light guide plate 16, the principal surface 16b being described below. The bottom 20b has a floor face 20d that is a light-guide-plate-16-side surface. The floor face 20d has a planar surface $20d\_1$ and a concave surface $20d_2$ included in a recessed portion 20c described below. The light guide plate 16 is placed above the planar surface $20d_1$. The side wall 20a is a part that is integrally raised from the bottom 20b along the long side of a light entering surface 16c of the light guide plate 16 in the direction in which light is output from the light guide plate 16 (the normal direction of the planar surface $20d_1$ of the floor face 20d (the positive direction of the Z-axis)). The light entering surface 16c is described below. The side wall 20a has a side face 20e that is an inner-side side face. Furthermore, the bottom 20b has the recessed portion 20c. The recessed portion 20c is a member that is formed in a recessed manner in the direction opposite to the direction in which light is output from the light guide plate 16 along the side face 20e from the side-face-20e-side part of the floor face 20d (the negative direction of the Z-axis), and used for housing the bottom end of the FPC 12. The recessed portion 20c has the concave surface $20d_2$. The first connecting member 15 is arranged in the recessed portion 20c (to be more specific, on the concave surface $20d_2$ of the recessed portion 20c) and hence, the width of the recessed portion 20c (the dimension of the recessed portion 20c in the Y-axis direction) is formed in a comparatively wide shape so that the first connecting member 15 that is larger in size can be arranged in the recessed portion 20c.

The light guide plate 16 is formed of a transparent material (polycarbonate resin, for example) in a rectangular shape as viewed in a top view. The light guide plate 16 has two principal surfaces 16a and 16b, and a light entering side face (light entering surface) 16c that is a side face facing the LED 14 in an opposed manner. The light entering surface 16c is a strip-shaped surface extending in the transverse direction of the planar illumination apparatus 10. The light emitted from the LED 14 is incident on the light entering surface 16c. The principal surface 16a is a light output surface from which the light entered from the light entering surface 16c (light emitted from the LED 14) is output. Accordingly, in the following explanation, "principal surface 16a" may be described as "light output surface 16a". An optical path change pattern constituted of a plurality of dots is, for example, formed on a principal-surface-16b-side face of the light guide plate 16, the principal-surface-16b-side face being a face opposite to the light output surface 16a. The optical path change pattern is formed thus changing the direction of light traveling in the inside of the light guide plate 16, and the light is output from the light output surface 16a. That is, the planar illumination apparatus 10 according to the embodiment is what is called an edge-light illumination apparatus.

The reflective sheet 21 reflects light leaked from the principal surface 16b opposite to the light output surface 16a to return the light to the light guide plate 16. The reflective sheet 21 is arranged between the principal surface 16b of the light guide plate 16 and the floor face 20d in a state that the reflective sheet 21 is fixed on the floor face 20d (to be more specific, on the planar surface $20d_1$ of the floor faces 20d) with the use of the double-sided tape 22.

The double-sided tape 22 is, for example, a white-colored double-sided tape. One surface of the double-sided tape 22 is stuck on a part of the reflective sheets 21, and the other surface is stuck on the floor face 20d (to be more specific, the planar surface $20d_1$ of the floor face 20d). Due to such constitution, the double-sided tape 22 fixes the reflective sheet 21 on the floor face 20d.

The LED 14 is a point-like light source (punctiform light source). The LED 14 is, for example, a pseudo white LED constituted of a blue LED and a yellow fluorescent substance. The LED 14 is formed in an approximately rectangular parallelepiped shape as a whole, and has a light-emitting surface 14a, and a surface opposite to the light-emitting surface 14a, the surface being placed on a mounting surface 12a (describes below) of the FPC 12. The LED 14 is what is called a top view type LED. In the present embodiment, the LEDs 14 are arranged on the mounting surface 12a in a predetermined spaced apart manner along the long side direction (X-axis direction) of the mounting surface 12a. That is, the light-emitting surface 14a of each of the LEDs 14 faces the light entering surface 16c of the light guide plate 16 in an opposed manner. In this state, the LEDs 14 are arranged in a predetermined spaced apart manner along the long side direction (X-axis direction) of a light entering surface 16c. Furthermore, each of the LEDs 14 emits light toward the light entering surface 16c. In this manner, each of the LEDs 14 emits light to be incident on the light entering surface 16c. Here, the LED 14 may be a side view type LED.

The FPC 12 is a strip-shaped substrate extending in the transverse direction (the X-axis direction (the long side direction of the light entering surface 16c)) of the planar illumination apparatus 10. The FPC 12 has two principal surfaces 12a and 12b. Each of two principal surfaces 12a and 12b is a strip-shaped surface extending in the transverse direction of the planar illumination apparatus 10. Out of two principal surfaces 12a and 12b, the principal surface 12a is a mounting surface on which the LED 14 is mounted. Accordingly, the "principal surface 12a" may be hereinafter described as "mounting surface 12a". The mounting surface 12a faces a surface opposite to the light-emitting surface 14a of the LED 14 in an opposed manner. The LED 14 is driven and turned on by the control of a drive circuit (not illustrated in the drawings) via the FPC 12. Furthermore, the principal surface 12b is a surface opposite to the mounting surface 12a. Accordingly, the "principal surface 12b" may be hereinafter described as "opposite surface 12b".

The fixing member 13 fixes the FPC 12 to the side face 20e of the frame 20. The fixing member 13 is, for example, a double-sided tape. One surface of the fixing member 13 is stuck on the opposite surface 12b of the FPC 12, and the other surface of the fixing member 13 is stuck on the side face 20e thus fixing the FPC 12 to the side face 20e.

The first connecting member 15 is arranged between the light guide plate 16 (the LED 14) and the floor face 20d (to be more specific, the concave surface $20d_2$ of the floor face 20d) thus connecting the light guide plate 16 and the LED 14 with each other in an optical manner or in a structural manner. To be more specific, the first connecting member 15 connects the light entering surface 16c of the light guide plate 16 and the light-emitting surface 14a of the LED 14 in a state that the optical axis of the light guide plate 16 and the optical axis of the LED 14 coincide with each other. The first connecting member 15 is a strip-shaped single-sided tape including an adhesive layer (adhesive) 15a and a base material 15b.

The base material 15b is, for example, composed of a polyethylene terephthalate material (PET), and the adhesive layer 15a is, for example, composed of a silicon resin or an acrylic resin. The adhesive layer 15a adheres to at least a part of the principal surface 16b of the light guide plate 16, the part being close to the LED 14, and at the same time, adheres to at least a part of the floor-face-20d-side surface of the LED 14, the part being close to the light guide plate 16. Due to such constitution, at least a part of the principal surface 16b of the light guide plate 16 and at least a part of the floor-face-20d-side surface of the LED 14 are attached to the first connecting member 15. As a result, the first connecting member 15 connects the light entering surface 16c of the light guide plate 16 and the light-emitting surface 14a of the LED 14 with each other.

Here, a case is explained in which the first connecting member 15 is a double-sided tape. In this case, the light guide plate 16 and the LED 14 are fixed to the floor face 20d and hence, when any force is applied to the planar illumination apparatus 10 from the outside, the light guide plate 16 and the LED 14 may be damaged because the force is incapable of being released. However, the first connecting member 15 according to the present embodiment is a single-sided tape, the light guide plate 16 and the LED 14 are not fixed to the floor face 20d and hence, the light guide plate 16 and the LED 14 is capable of releasing the force applied from the outside. Accordingly, the planar illumination apparatus 10 according to the present embodiment is capable of suppressing the occurrence of breakages in the light guide plate 16 and the LED 14.

The first connecting member 15 has a member that absorbs light, or a member that reflects light. For example, when the first connecting member 15 has the member that reflects light, the first connecting member 15 reflects light emitted from the light-emitting surface 14a of the LED 14 and returns the light to the light guide plate 16 thus improving the luminance of the planar illumination apparatus 10.

The second connecting member 17 is arranged on the side opposite to the first connecting member 15 with respect to the light guide plate 16 and the LED 14, and connects the light guide plate 16 and the LED 14 in an optical manner or in a structural manner. To be more specific, the second connecting member 17 connects the light entering surface 16c of the light guide plate 16 and the light-emitting surface 14a of the LED 14. The second connecting member 17 is arranged between the diffusion sheet 18 described below and the light guide plate 16 (LED 14). The second connecting member 17 is, for example, a double-sided tape. One surface of the second connecting member 17 is stuck on at least a part of the light output surface 16a of the light guide plate 16, the part being close to the LED 14 and, at the same time, stuck on at least a part of the surface opposite to the floor-face-20d-side surface of the LED 14, the part being close to the light guide plate 16. Due to such constitution, at least a part of the light output surface 16a of the light guide plate 16 and at least a part of the surface opposite to the floor-face-20d-side surface of the LED 14 are attached to the second connecting member 17. As a result, the second connecting member 17 connects the light entering surface 16c of the light guide plate 16 and the light-emitting surface 14a of the LED 14 with each other.

Furthermore, the other surface of the second connecting member 17 is stuck on at least a part of the side-wall-20a-side surface of the diffusion sheet 18. Due to such constitution, the second connecting member 17 fixes the diffusion sheet 18 to the light guide plate 16 and the LED 14. Accordingly, the second connecting member 17 is capable of suppressing the separation of the diffusion sheet 18 from the light guide plate 16 thus suppressing the deterioration of luminance characteristics, such as the luminance and luminance distribution of light emitted from the light-emitting region 90.

The diffusion sheet 18 is arranged on the light output surface 16a side of the light guide plate 16, and diffuses the light output from the light output surface 16a. To be more specific, the diffusion sheet 18 is arranged so as to cover the light output surface 16a and at least a part of the surface of the LED 14 that is opposite to the floor face 20d, and diffuses the light output from the light output surface 16a. The diffusion sheet 18 is, as mentioned above, fixed to the light guide plate 16 and the LED 14 through the second connecting member 17.

The prism sheet 19 is arranged on the surface of the diffusion sheet 18 that is opposite to the surface facing the light output surface 16a, controls the distribution of the light diffused through the diffusion sheet 18, and outputs the distribution-controlled light.

The shielding sheet 30 is arranged so as to cover a part of the side-wall-20a-side surface of the prism sheet 19, and blocks the light output from a partial area of the light output surface 16a of the light guide plate 16.

The shielding sheet 30 includes the first shielding sheet 30a and the second shielding sheet 30b. For example, the first shielding sheet 30a is a single-sided tape capable of blocking light. One end side of the first shielding sheet 30a is stuck on the outside surface of the side wall 20a of the frame 20. For example, the second shielding sheet 30b is a double-sided tape capable of blocking light. Out of two surfaces of the second shielding sheet 30b, one end side of one surface is stuck on the other end side of the first shielding sheet 30a, and the other end side of the one surface is stuck on the side wall 20a side of the prism sheet 19. Furthermore, the other surface of the second shielding sheet 30b is stuck on a liquid crystal display that uses the planar illumination apparatus 10 as a back light.

An external connection part 50 of the FPC 12 is inserted into a hole (not illustrated in the drawings) formed in an extending manner between the side wall 20a side of the recessed portion 20c and the bottom end side of the side wall 20a, and bent along the outside surface of the bottom 20b.

Figure 3B:
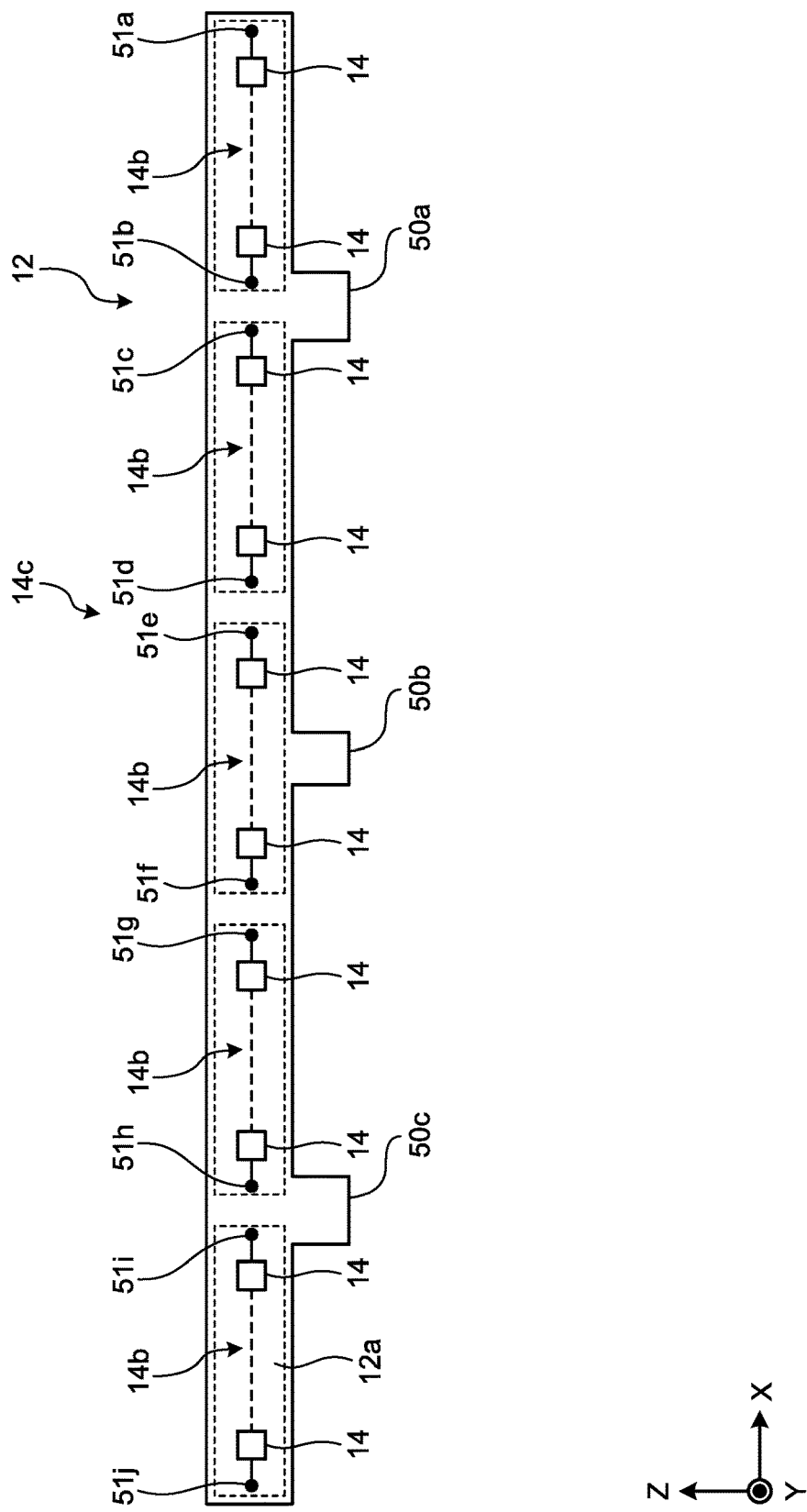
FIG. 3B is a front view illustrating schematically the mounting surface of the FPC according to the embodiment.
Figure 5:
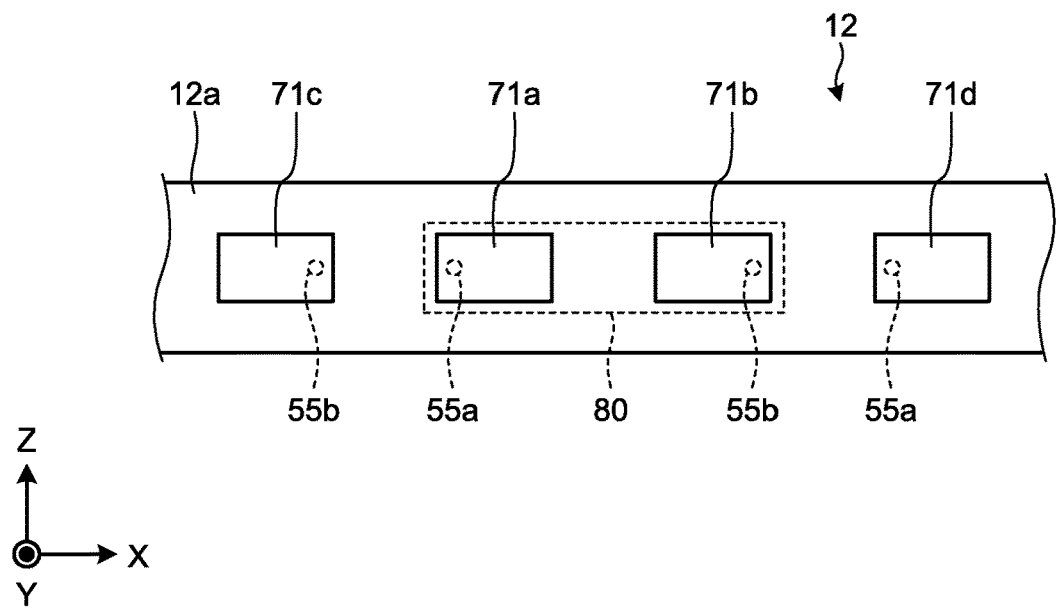
FIG. 5 is a front view illustrating a part of the illustrative example of the mounting surface of the FPC according to the embodiment.

FIG. 3A is a front view illustrating schematically the opposite surface 12b of the FPC 12 according to the embodiment, and FIG. 3B is a front view illustrating schematically the mounting surface 12a of the FPC 12 according to the embodiment. FIG. 4 is a front view illustrating the illustrative example of the opposite surface 12b of the FPC 12 according to the embodiment. FIG. 5 is a front view illustrating a part of the illustrative example of the mounting surface 12a of the FPC 12 according to the embodiment.

In FIG. 3B, five LED rows (light source array) 14b each of which is constituted of eight LEDs 14 connected in series are connected in parallel on the mounting surface 12a. That is, a total of 40 LEDs 14 are mounted on the mounting surface 12a. As illustrated in FIG. 3B, the LEDs 14 that constitute the LED row 14b are mounted on the mounting surface 12a in a state that the LEDs 14 are arranged in line along the X-axis direction (first direction).

One example of mounting the LED 14 is explained. As illustrated in FIG. 5, lands 71a to 71d are formed on the mounting surface 12a of the FPC 12. Here, the land 71a is electrically connected with a through hole 55a described below. The land 71b is electrically connected with a through hole 55b described below. One LED 14 is arranged on an area 80, the exterior electrode (anode) of the LED 14 is electrically connected with the land 71a, and the exterior electrode (cathode) of the LED 14 is electrically connected with the land 71b. The land 71c is electrically connected with the through hole 55b described below, and the land 71d is electrically connected with the through hole 55a described below. Furthermore, the exterior electrode (cathode) of another LED 14 adjacent to the LED 14 in the X-axis negative direction is electrically connected with the land 71c, and the exterior electrode (anode) of the other LED 14 adjacent to the LED 14 in the X-axis positive direction is electrically connected with the land 71d. As illustrated in FIG. 5, the through hole 55a is formed in each of the areas of the lands 71a and 71d as viewed in an XZ-planar view. The through hole 55b is formed in each of the areas of the lands 71b and 71c. Hereinafter, when explaining without differentiating all the lands including the lands 71a to 71d mentioned above, they may be described as "land 71". Lands 71 other than the lands 71a to 71d mentioned above are described in the same manner as above.

Here, the total number of the LEDs 14, the number of the LEDs 14 that constitute the LED row 14b, and the parallel number of the LED rows 14b are not limited to the case above. A group of LEDs 14 constituted of 40 LEDs 14 is referred to as "LED group 14c".

As illustrated in FIG. 3A, FIG. 3B, and FIG. 4, through holes 51a to 51j are formed in the FPC 12. Hereinafter, when explaining without differentiating the ten through holes 51a to 51j, they may be described as "through hole 51".

As illustrated in FIG. 3A and FIG. 4, the FPC 12 is provided with routing wiring 52a to 52j. In FIG. 3B, out of eight LEDs 14 that constitute the LED row 14b arranged on the rightmost (right end) side of the FPC 12, the LED 14 arranged on the rightmost side of the LED row 14b is connected with the routing wiring 52a, which is illustrated in FIG. 3A and FIG. 4, via the through hole 51a. Furthermore, in FIG. 3B, out of eight LEDs 14 that constitute the LED row 14b arranged on the right end side of the FPC 12, the LED 14 arranged on the leftmost side of the LED row 14b is connected with the routing wiring 52b, which is illustrated in FIG. 3A and FIG. 4, via the through hole 51b. That is, the routing wiring 52a is connected with the through hole 51a, and the routing wiring 52b is connected with the through hole 51b. Here, an area 57a illustrated in FIG. 3A is an area where a part of the routing wiring 52a and the routing wiring 52b connected with the LED row 14b arranged on the right end side of the FPC 12 in FIG. 3B, and wiring (series wiring 56 described below) that connects serially eight LEDs 14 that constitute the LED row 14b arranged on the right end side of the FPC 12 in FIG. 3B are formed on the opposite surface 12b of the FPC 12.

In FIG. 3B, out of eight LEDs 14 that constitute the LED row 14b located at the second place from the right end side of the FPC 12, the LED 14 arranged on the rightmost side of the LED row 14b is connected with the routing wiring 52c, which is illustrated in FIG. 3A and FIG. 4, via the through hole 51c. Furthermore, in FIG. 3B, out of eight LEDs 14 that constitute the LED row 14b located at the second place from the right end side of the FPC 12, the LED 14 arranged on the leftmost side of the LED row 14b is connected with the routing wiring 52d, which is illustrated in FIG. 3A and FIG. 4, via the through hole 51d. That is, the routing wiring 52c is connected with the through hole 51c, and the routing wiring 52d is connected with the through hole 51d. Here, an area 57b illustrated in FIG. 3A is an area where a part of the routing wiring 52c and the routing wiring 52d connected with the LED row 14b located at the second place from the right end side of the FPC 12 in FIG. 3B, and wiring (series wiring 56 described below) that connects serially eight LEDs 14 that constitute the LED row 14b located at the second place from the right end side of the FPC 12 in FIG. 3B are formed on the opposite surface 12b of the FPC 12.

As illustrated in FIG. 3A, the FPC 12 according to the present embodiment has three (a plurality of) external connection parts 50a, 50b, and 50c arranged on the lower end side (Z-axis negative direction side) of the FPC 12. Each of the external connection parts 50a, 50b, and 50c is formed in an elongated strip shape. A conductive part 53a is formed in the external connection part 50a. The routing wiring 52a, the routing wiring 52b, the routing wiring 52c, and the routing wiring 52d are connected with the conductive part 53a. That is, the FPC 12 has one external connection part 50a corresponding to two LED rows 14b. Here, the conductive part 53a is electrically connected with the drive circuit mentioned above.

In FIG. 3B, out of eight LEDs 14 that constitute the LED row 14b located at the third place from the right end side of the FPC 12, the LED 14 arranged on the rightmost side of the LED row 14b is connected with the routing wiring 52e, which is illustrated in FIG. 3A and FIG. 4, via the through hole 51e. Furthermore, in FIG. 3B, out of eight LEDs 14 that constitute the LED row 14b located at the third place from the right end side of the FPC 12, the LED 14 arranged on the leftmost side of the LED row 14b is connected with the routing wiring 52f, which is illustrated in FIG. 3A and FIG. 4, via the through hole 51f. That is, the routing wiring 52e is connected with the through hole 51e, and the routing wiring 52f is connected with the through hole 51f. Here, an area 57c illustrated in FIG. 3A is an area where a part of the routing wiring 52e and the routing wiring 52f connected with the LED row 14b located at the third place from the right end side of the FPC 12 in FIG. 3B, and wiring (series wiring 56 described below) that connects serially eight LEDs 14 that constitute the LED rows 14b located at the third place from the right end side of the FPC 12 in FIG. 3B are formed on the opposite surface 12b of the FPC 12.

Furthermore, as illustrated in FIG. 3A, a conductive part 53b is formed in the external connection part 50b. The routing wiring 52e and the routing wiring 52f are connected with the conductive part 53b. That is, the FPC 12 has one external connection part 50b corresponding to one LED row 14b. Here, the conductive part 53b is electrically connected with the drive circuit mentioned above.

In FIG. 3B, out of eight LEDs 14 that constitute the LED row 14b located at the second place from the leftmost (left end) side of the FPC 12, the LED 14 arranged on the rightmost side of the LED row 14b is connected with the routing wiring 52g, which is illustrated in FIG. 3A and FIG. 4, via the through hole 51g. Furthermore, out of eight LEDs 14 that constitute the LED row 14b located at the second place from the left end of the FPC 12 in FIG. 3B, the LED 14 arranged on the leftmost side of the LED row 14b is connected with the routing wiring 52h, which is illustrated in FIG. 3A and FIG. 4, via the through hole 51h. That is, the routing wiring 52g is connected with the through hole 51g, and the routing wiring 52h is connected with the through hole 51h. Here, an area 57d illustrated in FIG. 3A is an area where a part of the routing wiring 52g and the routing wiring 52h connected to the LED row 14b located at the second place from the left end side of the FPC 12 in FIG. 3B, and wiring (series wiring 56 described below) that connects serially eight LEDs 14 that constitute the LED row 14b located at the second place from the left end side of the FPC 12 in FIG. 3B are formed on the opposite surface 12b of the FPC 12.

In FIG. 3B, out of eight LEDs 14 that constitute the LED row 14b arranged on the left end side of the FPC 12, the LED 14 arranged on the rightmost side of the LED row 14b is connected with the routing wiring 52i, which is illustrated in FIG. 3A and FIG. 4, via the through hole 51i. Furthermore, in FIG. 3B, out of eight LEDs 14 that constitute the LED row 14b arranged on the left end side of the FPC 12, the LED 14 arranged on the leftmost side of the LED row 14b is connected with the routing wiring 52j, which is illustrated in FIG. 3A and FIG. 4, via the through hole 51j. That is, the routing wiring 52i is connected with the through hole 51i, and the routing wiring 52j is connected with the through hole 51j. Here, an area 57e illustrated in FIG. 3A is an area where a part of the routing wiring 52i and the routing wiring 52j connected with the LED row 14b arranged on the left end side of the FPC 12 in FIG. 3B, and wiring (series wiring 56 described below) that connects serially eight LEDs 14 that constitute the LED row 14b arranged on the left end side of the FPC 12 in FIG. 3B are formed on the opposite surface 12b of the FPC 12.

Furthermore, as illustrated in FIG. 3A, a conductive part 53c is formed in the external connection part 50c. The routing wiring 52g, the routing wiring 52h, the routing wiring 52i, and the routing wiring 52j are connected with the conductive part 53c. That is, the FPC 12 has one external connection part 50c corresponding to two LED rows 14b. Here, the conductive part 53c is electrically connected with the drive circuit mentioned above.

Hereinafter, when explaining without differentiating the external connection parts 50a to 50c, they may be described as "external connection part 50". When explaining without differentiating the plurality of routing wiring 52a to 52j, they may be described as "routing wiring 52". The routing wiring 52 is one example of second wiring. Furthermore, when explaining without differentiating the conductive parts 53a to 53c, they may be described as "conductive part 53".

Here, illustrative examples of the conductive parts 53a to 53c are explained with reference to FIG. 4. As illustrated in FIG. 4, the conductive part 53a has a connection pad 54a, a connection pad 54b, and a connection pad 54c. The routing wiring 52a is connected with the connection pad 54a, the routing wiring 52c is connected with the connection pad 54b, and the routing wiring 52b and the routing wiring 52d are connected with the connection pad 54c. For example, the routing wiring 52a is connected with the cathode of the LED 14, which is arranged on the rightmost side of the LED row 14b, out of eight LEDs 14 that constitute the LED row 14b arranged on the rightmost side of the FPC 12 in FIG. 3B. The routing wiring 52b is connected with the anode of the LED 14, which is arranged on the leftmost side of the LED row 14b, out of eight LEDs 14 that constitute the LED row 14b arranged on the rightmost side of the FPC 12 in FIG. 3B. The routing wiring 52c is connected with the cathode of the LED 14, which is arranged on the rightmost side of the LED row 14b, out of eight LEDs 14 that constitute the LED row 14b located at the second place from the rightmost side of the FPC 12 in FIG. 3B. Furthermore, the routing wiring 52d is connected with the anode of the LED 14, which is arranged on the leftmost side of the LED row 14b, out of eight LEDs 14 that constitute the LED row 14b located at the second place from the right end side of the FPC 12 in FIG. 3B.

The conductive part 53b has a connection pad 54d and a connection pad 54e. The routing wiring 52e is connected with the connection pad 54d, and the routing wiring 52f is connected with the connection pad 54e. For example, the routing wiring 52e is connected with the cathode of the LED 14, which is arranged on the rightmost side of the LED row 14b, out of eight LEDs 14 that constitute the LED row 14b located at the third place from the right end side of the FPC 12 in FIG. 3B. Furthermore, the routing wiring 52f is connected with the anode of the LED 14, which is arranged on the leftmost side of the LED row 14b, out of eight LEDs 14 that constitute the LED row 14b located at the third place from the right end side of the FPC 12 in FIG. 3B.

The conductive part 53c has a connection pad 54f, a connection pad 54g, and a connection pad 54h. The routing wiring 52g is connected with the connection pad 54f, the routing wiring 52i is connected with the connection pad 54g, and the routing wiring 52h and the routing wiring 52j are connected with the connection pad 54h. For example, the routing wiring 52g is connected with the cathode of the LED 14, which is arranged on the rightmost side of the LED row 14b, out of eight LEDs 14 that constitute the LED row 14b located at the second place from the left end side of the FPC 12 in FIG. 3B. The routing wiring 52h is connected with the anode of the LED 14, which is arranged on the leftmost side of the LED row 14b, out of eight LEDs 14 that constitute the LED row 14b located at the second place from the left end side of the FPC 12 in FIG. 3B. The routing wiring 52i is connected with the cathode of the LED 14, which is arranged on the rightmost side of the LED row 14b, out of eight LEDs 14 that constitute the LED row 14b arranged on the leftmost side of the FPC 12 in FIG. 3B. Furthermore, the routing wiring 52*j* is connected with the anode of the LED 14, which is arranged on the leftmost side of the LED row 14*b*, out of eight LEDs 14 that constitute the LED row 14*b* arranged on the leftmost side of the FPC 12 in FIG. 3B.

Hereinafter, when explaining without differentiating the connection pads 54*a* to 54*h*, they may be described as "connection pad 54".

As mentioned above, the routing wiring 52 connected with each LED row 14*b* (a plurality of LEDs 14 (eight LEDs 14 in the present embodiment)) is formed on the opposite surface 12*b* opposite to the mounting surface 12*a* of the FPC 12. The routing wiring 52 is wiring extending from each of both ends of each LED row 14*b* (eight LEDs 14 in the present embodiment).

As illustrated in FIG. 3A, the wiring (series wiring) 56 each of which serially connects two LEDs 14 adjacent to each other is formed on the opposite surface 12*b* of the FPC 12, the number of the wiring 56 depending on the number of the LEDs 14 connected serially with each other. That is, the FPC 12 is provided with the series wiring 56. For example, the series wiring 56 arranged on the leftmost (left end) side of the FPC 12 (hereinafter, referred to as "left end series wiring") in FIG. 3A is connected with the exterior electrode (anode) of the LED 14, which is arranged on the rightmost side of the LED row 14*b*, out of eight LEDs 14 that constitute the LED row 14*b* arranged on the rightmost (right end) side of the FPC 12 in FIG. 3B, via the through hole 55*a*. Furthermore, the left end series wiring 56 is connected with the exterior electrode (cathode) of the other LED 14 next to the LED 14, which is arranged on the rightmost side of the LED row 14*b*, out of eight LEDs 14 that constitute the LED row 14*b* arranged on the rightmost (right end) side of the FPC 12 in FIG. 3B, via the through hole 55*b*. In the same manner as above, the other series wiring 56 also connects electrically and serially two LEDs 14 adjacent to each other via the through holes 55*a* and 55*b*. That is, one end of the series wiring 56 is connected with one LED 14, out of two LEDs 14 adjacent to each other, via the through hole 55*a*, and the other end of the series wiring 56 is connected with the other LED 14 via the through hole 55*b*. The series wiring 56 is one example of first wiring, the through hole 55*a* is one example of a first through hole, and the through hole 55*b* is one example of a second through hole. Here, each of the through holes 55*a* and 55*b* is, for example, a blind via hole (BVH).

Furthermore, a cover lay (not illustrated in the drawings) is arranged on the opposite surface 12*b* so as to cover the series wiring 56 and the routing wiring 52. That is, the FPC 12 is provided with the cover lay.

In the planar illumination apparatus 10 according to the present embodiment, the series wiring 56 is not formed on the mounting surface 12*a* of the FPC 12, on which the LED 14 is mounted, but formed on the opposite surface 12*b* opposite to the mounting surface 12*a*. Furthermore, in the planar illumination apparatus 10 according to the present embodiment, the cover lay is not arranged on the mounting surface 12*b*, but arranged on the opposite surface 12*b*. Here, the LED 14 is not mounted on the opposite surface 12*b* thus achieving the comparatively less restriction in shape of the cover lay arranged. Accordingly, it is easy to arrange the cover lay on the opposite surface 12*b*, compared with a case in which the cover lay is arranged on the mounting surface 12*a*. Consequently, in the planar illumination apparatus 10 according to the present embodiment, it is possible to easily arrange the cover lay that protects the series wiring 56 and the routing wiring 52 from disconnection.

Furthermore, electrical components such as the LED 14 are not mounted on the opposite surface 12*b* thus achieving the comparatively high degree of freedom in pattern shape of the series wiring 56. For example, it is possible to form the series wiring 56 in a monotonous shape with a comparatively thick wiring width. In addition, soldering is not required for the series wiring 56 thus increasing the strength of the series wiring 56, and suppressing the occurrence of disconnections of the series wiring 56 due to stress concentration at the end of a solder.

Figure 6:
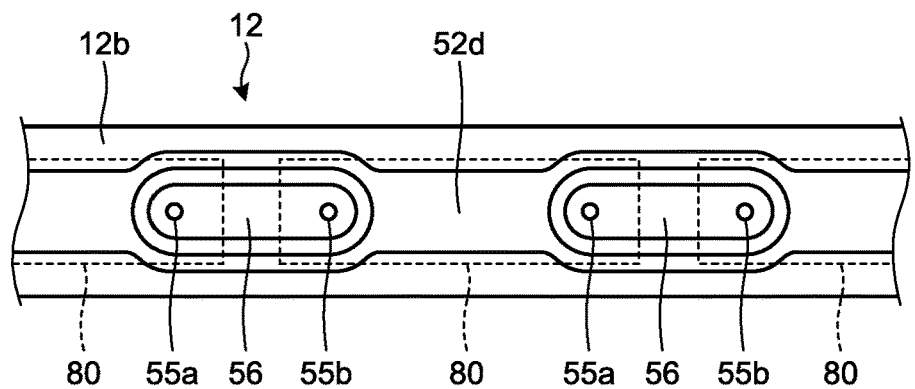
FIG. 6 is an enlarged view of a part of the FPC in FIG. 4.

FIG. 6 is an enlarged view of a part 70 of the FPC 12 in FIG. 4. As illustrated in FIG. 6, the series wiring 56 is wiring formed in a strip shape extending in the X-axis direction (direction in which a plurality of LEDs 14 are arranged in line), and having both ends each of which is rounded. As illustrated in FIG. 6, the routing wiring 52*d* is formed on the opposite surface 12*b* so as not to be in contact (interfere) with the series wiring 56. To be more specific, as illustrated in FIG. 6, the series wiring 56 is, for example, formed in a center portion in the short side direction (Z-axis direction) on the opposite surface 12*b* of the FPC 12. Here, the center portion in the short side direction on the opposite surface 12*b* indicates, for example, a certain area close to the center of the opposite surface 12*b* in the short side direction. In the area in which the series wiring 56 is not formed in the long side direction (X-axis direction) of the opposite surface 12*b*, the routing wiring 52*d* is formed in the center portion in the short side direction of the opposite surface 12*b* in such a manner that the routing wiring 52*d* extends in the long side direction of the opposite surface 12*b*, and branches into two pieces of (a plurality of) wiring at the part facing the end portion of the series wiring 56. Furthermore, in the area in which the series wiring 56 is formed in the long side direction of the opposite surface 12*b*, two pieces of branched wiring is formed on the respective both sides of the series wiring 56 in the short side direction of the opposite surface 12*b*. The routing wiring 52*a*, the routing wiring 52*e*, the routing wiring 52*f*, the routing wiring 52*g*, and the routing wiring 52*j* are also formed on the opposite surface 12*b* so as not to be in contact with the series wiring 56, in the same manner as the case of the routing wiring 52*d*. Due to such constitution, it is possible to suppress the occurrence of short circuits of the LED 14.

The planar illumination apparatus 10 according to the present embodiment has been explained heretofore. As mentioned above, the planar illumination apparatus 10 according to the present embodiment is capable of suppressing the occurrence of disconnections of the series wiring (wiring that serially connects the LEDs 14 with each other) 56.

Here, the routing wiring 52 to be connected with the anode of the LED 14 mentioned above may be connected with the cathode of the LED 14, and the routing wiring 52 to be connected with the cathode of the LED 14 mentioned above may be connected with the anode of the LED 14. In this manner, when the connection of the routing wiring 52 with the cathode and the connection of the routing wiring 52 with the anode are switched, the series wiring 56 is connected with the exterior electrode (cathode) of the LED 14 via the through hole 55*a*, and connected with the exterior electrode (anode) of the LED 14 via the through hole 55*b*.

Modification of Embodiment

In the above-mentioned embodiment, a case is explained in which the number of the external connection parts 50 is three. However, the number of the external connection parts 50 is not limited to the case above. For example, the number of the external connection parts 50 may be reduced to two. Here, an embodiment such that the number of the external connection parts 50 is two is explained as a planar illumination apparatus according to a modification of the above-mentioned embodiment. In the explanation of a first modification, constitutional features identical with those in the above-mentioned embodiment are given the same numerals, and their repeated explanations may be omitted.

Figure 7:
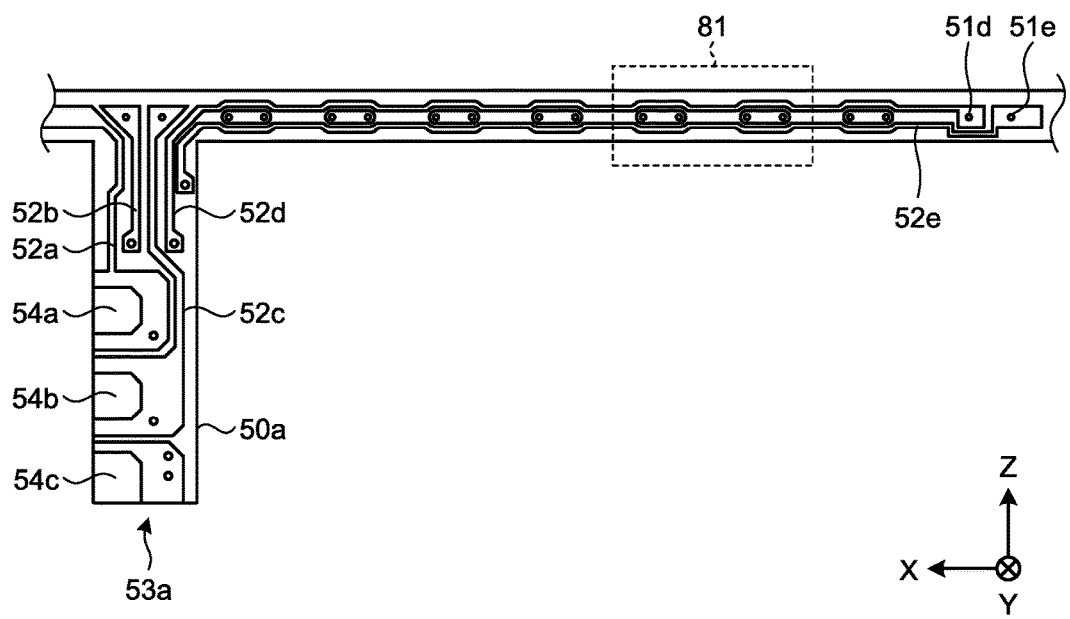
FIG. 7 is a view for explaining a planar illumination apparatus according to a modification of the embodiment.
Figure 8:
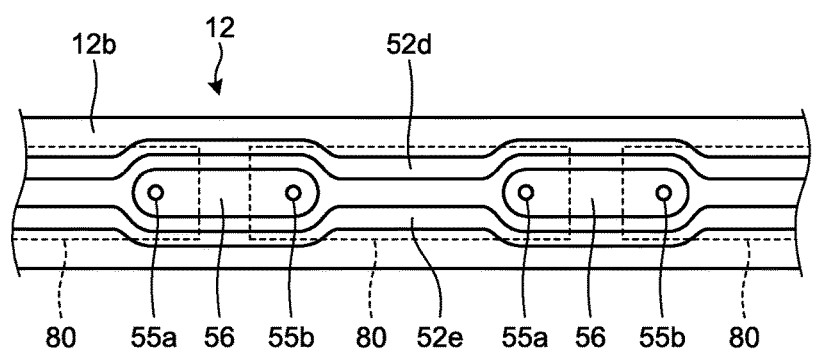
FIG. 8 is an enlarged view of a part in FIG. 7.
Figure 9:
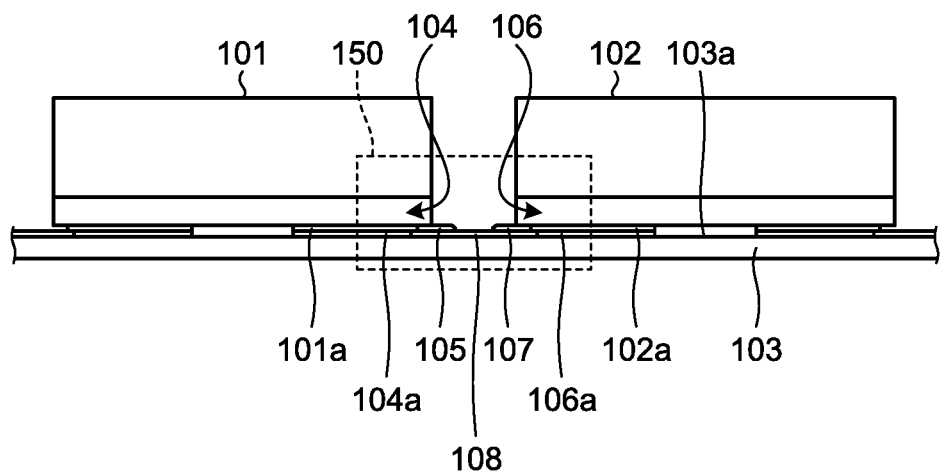
FIG. 9 is a view for explaining problems when series wiring is formed on the mounting surface of the FPC.
Figure 10:
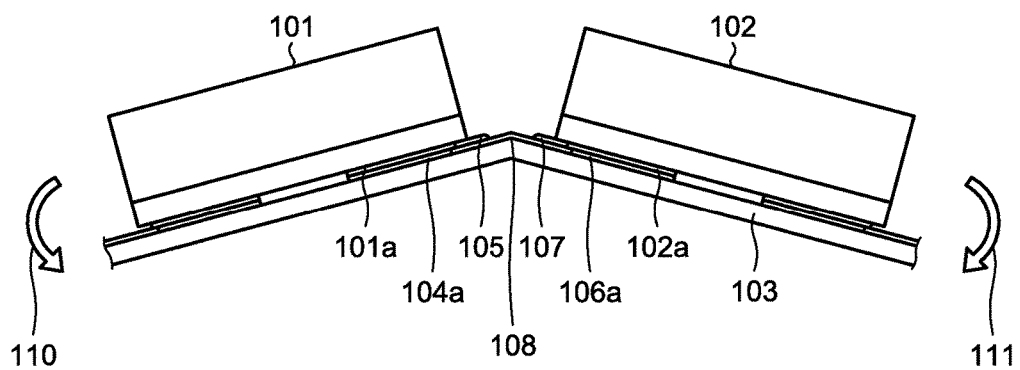
FIG. 10 is a view for explaining the problems when the series wiring is formed on the mounting surface of the FPC.
Figure 11:
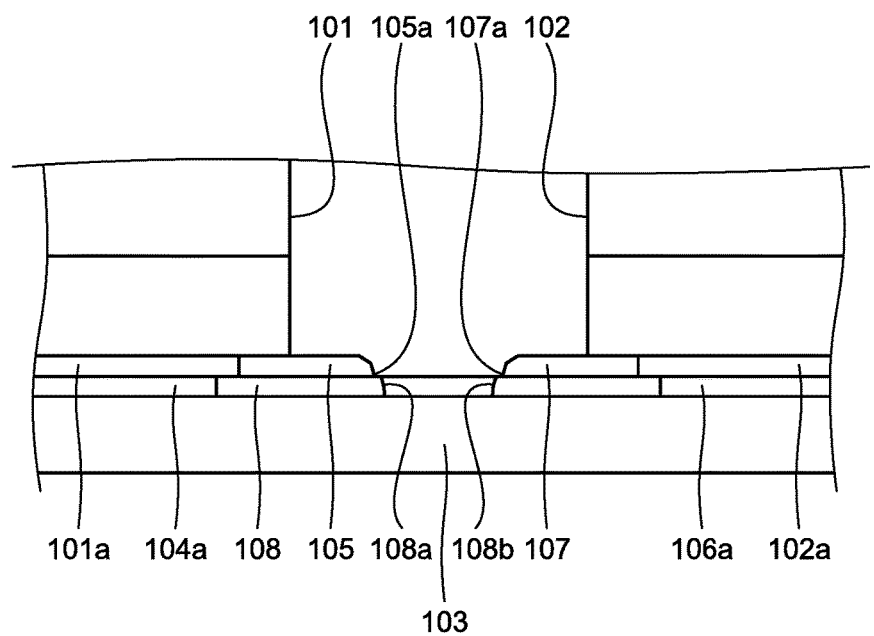
FIG. 11 is a view for explaining the problems when the series wiring is formed on the mounting surface of the FPC.

The planar illumination apparatus according to the modification differs from the planar illumination apparatus 10 according to the above-mentioned embodiment in that the planar illumination apparatus according to the modification is provided with only two external connection parts 50a and 50c out of the external connection parts 50a to 50c. FIG. 7 is a view for explaining the planar illumination apparatus according to the modification of the embodiment. FIG. 8 is an enlarged view of a part 81 in FIG. 7.

As illustrated in FIG. 7, in the planar illumination apparatus according to the modification, the routing wiring 52e extends toward the external connection part 50a. The routing wiring 52e is connected with the connection pad 54a or the connection pad 54b. Furthermore, each of the routing wiring 52d and the routing wiring 52e according to the modification has a narrow wiring width compared with the routing wiring 52d and the routing wiring 52e according to the embodiment. This is because the routing wiring 52d and the routing wiring 52e extend toward the same external connection part 50 (external connection part 50a).

As illustrated in FIG. 8, the routing wiring 52e overlaps with the routing wiring 52d in the Z-axis direction. That is, the routing wiring 52d extending from one LED row 14b and the routing wiring 52e extending from the other LED row 14d overlap with each other in the Z-axis direction (second direction) that intersects with the X-axis direction.

Although not illustrated in the drawings, in the planar illumination apparatus according to the modification, the routing wiring 52f extends toward the external connection part 50c. The routing wiring 52f is connected with the connection pad 54h. Furthermore, each of the routing wiring 52f and the routing wiring 52g according to the modification has a narrow wiring width compared with the routing wiring 52f and the routing wiring 52g according to the embodiment. This is because the routing wiring 52f and the routing wiring 52g extend toward the same external connection part 50 (external connection part 50c).

Furthermore, the routing wiring 52f overlaps with the routing wiring 52g in the Z-axis direction. That is, the routing wiring 52g extending from one LED row 14b and the routing wiring 52f extending from the other LED row 14d overlap with each other in the Z-axis direction (second direction) that intersects with the X-axis direction.

In this manner, the routing wiring 52 extending from one LED row 14b, and the routing wiring 52 extending from the other LED row 14d overlap with each other in the Z-axis direction thus reducing the number of the external connection parts 50.

Here, in the above-mentioned embodiment and modification, although a case is explained in which the routing wiring 52 is formed on the opposite surface 12b of the FPC 12, the routing wiring 52 may be formed on the mounting surface 12a of the FPC 12. For example, to consider a case in which the LED 14 is mounted on the mounting surface 12a, when an area (space) for forming the routing wiring 52 can be secured in the mounting surface 12a, the routing wiring 52 may be formed on the mounting surface 12a.

In the above-mentioned embodiment and modification, a case is explained in which all the series wiring 56 is formed on the opposite surface 12b of the FPC 12. However, out of all the series wiring 56, some of the series wiring 56 may be formed on the opposite surface 12b of the FPC 12, and the other series wiring 56 may be formed on the mounting surface 12a of the FPC 12. Furthermore, all the series wiring 56 may be formed on both of the opposite surface 12b and the mounting surface 12a of the FPC 12. That is, with respect to all the series wiring 56, a part of the series wiring 56 may be formed on the opposite surface 12b, and the other part of the series wiring 56 may be formed on the mounting surface 12a.

According to one embodiment of the present invention, it is possible to suppress the occurrence of disconnections of the wiring that serially connects the LEDs one with another.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A planar illumination apparatus comprising:
a light guide plate configured to output light entered into the light guide plate through a side face of the light guide plate;
a plurality of light sources that are arranged on the side face side, and emit light to be entered into the side face;
a substrate having a mounting surface where the light sources are mounted in the longitudinal direction and an opposite surface that is located opposite to the mounting surface; and
first wiring formed on the opposite surface, the first wiring connecting serially the light sources with each other, wherein:
a first land and a second land corresponding to each of the plurality of the light sources, the first land and the second land being electronically connected with an exterior electrode of the light sources, are arranged on the mounting surface;
the first land is electrically connected with a first through hole, and the second land is electrically connected with a second through hole;
one end of the first wiring is connected with one light source, out of two light sources adjacent to each other, via the first through hole, and the other end of the first wiring is connected with the other light source via the second through hole; and
the first land and the second land are arranged not to protrude outside of the corresponding light source in the longitudinal direction of the substrate when viewed from the mounting surface side.
2. The planar illumination apparatus according to claim 1, further comprising second wiring extending from each of both ends of a light source array including the light sources connected serially with each other, the second wiring being formed on the opposite surface so as not to be in contact with the first wiring.
3. The planar illumination apparatus according to claim 2, wherein
the light sources connected serially with each other are mounted on the mounting surface while being arranged in line in a first direction,
a plurality of the light source arrays are arranged in line in the first direction on the mounting surface, and
the second wiring extending from one light source array and the second wiring extending from another light source array overlap with each other in a second direction intersecting with the first direction.

4. The planar illumination apparatus according to claim 2, further comprising a cover lay arranged on only the opposite surface, out of the mounting surface and the opposite surface, so as to cover the first wiring and the second wiring.

5. The planar illumination apparatus according to claim 2, wherein
the light sources connected serially with each other are mounted on the mounting surface while being arranged in line in a first direction,
the first wiring is formed in a center portion of the opposite surface in a second direction intersecting with the first direction,
in an area of the opposite surface where the first wiring is not formed in the first direction, the second wiring is formed in the center portion of the opposite surface in the second direction, and branches into a plurality of wiring at a part facing an end portion of the first wiring, and
in an area of the opposite surface where the first wiring is formed in the first direction, the plurality of wiring formed on both sides of the first wiring of the opposite surface in the second direction.

6. The planar illumination apparatus according to claim 2, wherein
the light sources connected serially with each other are mounted on the mounting surface in line in a first direction, and
the planar illumination apparatus further comprises an external connection part provided for the light source array or for two light source arrays adjacent to each other, wherein:
the planar illumination apparatus further comprises a plurality of the external connection parts, and
the second wiring in one light source array does not overlap with the second wiring in another light source array in a second direction intersecting with the first direction.

7. The planar illumination apparatus according to claim 1, wherein each of the first and second through holes includes a blind via hole.

8. The planar illumination apparatus according to claim 1, wherein the first through hole is formed within an area of the first land, and the second through hole is formed within an area of the second land.

9. A planar illumination apparatus comprising:
a light guide plate configured to output light entered into the light guide plate through a side face of the light guide plate;
a plurality of light sources that are arranged on the side face side, and emit light to be entered into the side face;
a substrate having a mounting surface where the light sources are mounted;
first wiring formed on an opposite surface opposite to the mounting surface of the substrate, the first wiring connecting serially the light sources with each other; and
second wiring extending from each of both ends of a light source array including the light sources connected serially with each other, the second wiring being formed on the opposite surface so as not to be in contact with the first wiring, wherein
the light sources connected serially with each other are mounted on the mounting surface while being arranged in line in a first direction,
the first wiring is formed in a center portion of the opposite surface in a second direction intersecting with the first direction,
in an area of the opposite surface where the first wiring is not formed in the first direction, the second wiring is formed in the center portion of the opposite surface in the second direction, and branches into a plurality of wiring at a part facing an end portion of the first wiring, and
in an area of the opposite surface where the first wiring is formed in the first direction, the plurality of wiring formed on both sides of the first wiring of the opposite surface in the second direction.

10. The planar illumination apparatus according to claim 9, wherein one end of the first wiring is connected with one light source, out of two light sources adjacent to each other, via a first through hole of the through holes, and the other end of the first wiring is connected with the other light source via a second through hole of the through holes.

11. The planar illumination apparatus according to claim 10, wherein each of the first and second through holes includes a blind via hole.

12. The planar illumination apparatus according to claim 9, further comprising a cover lay arranged on the opposite surface, out of the mounting surface and the opposite surface, so as to cover the first wiring.

13. The planar illumination apparatus according to claim 9, wherein
the light sources connected serially with each other are mounted on the mounting surface in line in a first direction, and
the planar illumination apparatus further comprises an external connection part provided for the light source array or for two light source arrays adjacent to each other, wherein
the planar illumination apparatus further comprises a plurality of the external connection parts, and
the second wiring in one light source array does not overlap with the second wiring in another light source array in a second direction intersecting with the first direction.

14. A planar illumination apparatus comprising:
a light guide plate configured to output light entered into the light guide plate through a side face of the light guide plate;
a plurality of light sources that are arranged on the side face side, and emit light to be entered into the side face;
a substrate having a mounting surface where the light sources are mounted;
first wiring formed on an opposite surface that is located opposite to the mounting surface, the first wiring connecting serially the light sources with each other;
second wiring extending from each of both ends of a light source array including the light sources connected serially with each other, the second wiring being formed on the opposite surface so as not to be in contact with the first wiring; and
a cover lay arranged on only the opposite surface and not arranged on the mounting surface, so as to cover the first wiring and the second wiring formed on the opposite side.

15. The planar illumination apparatus according to claim 14, wherein one end of the first wiring is connected with one light source, out of two light sources adjacent to each other, via a first through hole, and the other end of the first wiring is connected with the other light source via a second through hole.

16. The planar illumination apparatus according to claim 15, wherein each of the first and second through holes includes a blind via hole.

17. The planar illumination apparatus according to claim 14, wherein
the light sources connected serially with each other are mounted on the mounting surface in line in a first direction, and
the planar illumination apparatus further comprises an external connection part provided for the light source array or for two light source arrays adjacent to each other, wherein
the planar illumination apparatus further comprises a plurality of the external connection parts, and
the second wiring in one light source array does not overlap with the second wiring in another light source array in a second direction intersecting with the first direction.

18. The planar illumination apparatus according to claim 14, wherein
the light sources connected serially with each other are mounted on the mounting surface while being arranged in line in a first direction,
the first wiring is formed in a center portion of the opposite surface in a second direction intersecting with the first direction,
in an area of the opposite surface where the first wiring is not formed in the first direction, the second wiring is formed in the center portion of the opposite surface in the second direction, and branches into a plurality of wiring at a part facing an end portion of the first wiring, and
in an area of the opposite surface where the first wiring is formed in the first direction, the plurality of wiring formed on both sides of the first wiring of the opposite surface in the second direction.

19. The planar illumination apparatus according to claim 14, wherein
the light sources connected serially with each other are mounted on the mounting surface while being arranged in line in a first direction,
a plurality of the light source arrays are arranged in line in the first direction on the mounting surface, and
the second wiring extending from one light source array and the second wiring extending from another light source array overlap with each other in a second direction intersecting with the first direction.

* * * * *